(12) United States Patent
Fredrickson (10) Patent No.: US 8,764,211 B2
(45) Date of Patent: Jul. 1, 2014

(54) NON-OPAQUE JUNCTION BOX COVER WITH TROUBLESHOOTING ELECTRONIC CIRCUIT BOARD

(76) Inventor: Doug Fredrickson, Ridgefield, WA (US)

( * ) Notice: Subject to any disclaimer, the term of this patent is extended or adjusted under 35 U.S.C. 154(b) by 409 days.

(21) Appl. No.: 13/115,807

(22) Filed: May 25, 2011

(65) Prior Publication Data

US 2011/0292663 A1  Dec. 1, 2011

Related U.S. Application Data

(60) Provisional application No. 61/348,372, filed on May 26, 2010.

(51) Int. Cl.
*F21V 33/00* (2006.01)
*B60R 16/023* (2006.01)

(52) U.S. Cl.
CPC ................................. *B60R 16/0239* (2013.01)
USPC .............. 362/85; 362/365; 362/368; 174/535

(58) Field of Classification Search
USPC ........... 362/85, 154, 362, 365, 368, 375, 382;
439/535, 76.1, 76.2, 949; 174/54, 535,
174/541
See application file for complete search history.

(56) References Cited

U.S. PATENT DOCUMENTS

| | | | |
|---|---|---|---|
| 3,892,911 A | 7/1975 | Codrino | |
| 4,000,447 A | 12/1976 | Codrino | |
| 4,580,864 A * | 4/1986 | Knickerbocker | 439/395 |
| 4,775,324 A * | 10/1988 | Norden | 439/709 |
| 5,539,623 A * | 7/1996 | Gurz et al. | 362/20 |
| 5,549,478 A | 8/1996 | McGuire | |
| 5,964,051 A * | 10/1999 | Loeber et al. | 40/570 |
| 6,240,665 B1 * | 6/2001 | Brown et al. | 40/570 |
| 6,265,699 B1 | 7/2001 | Scott | |
| 6,657,852 B2 | 12/2003 | Reker | |
| 7,008,254 B2 * | 3/2006 | Matsunaga et al. | 439/352 |
| 7,011,422 B2 * | 3/2006 | Robertson et al. | 362/95 |
| 7,014,339 B2 * | 3/2006 | Sears et al. | 362/265 |
| 7,369,059 B2 | 5/2008 | Hoffman | |
| 7,394,367 B1 * | 7/2008 | Aupperle et al. | 340/540 |
| 7,491,065 B2 * | 2/2009 | Wagner | 439/35 |
| 8,393,747 B2 * | 3/2013 | Kevelos et al. | 362/95 |
| 2005/0037632 A1 * | 2/2005 | Ihde | 439/35 |
| 2005/0152128 A1 * | 7/2005 | Campman | 362/95 |
| 2009/0269951 A1 | 10/2009 | Scheele | |
| 2010/0216336 A1 * | 8/2010 | Quiter et al. | 439/567 |
| 2010/0240246 A1 * | 9/2010 | Williams et al. | 439/490 |

\* cited by examiner

*Primary Examiner* — John A Ward
(74) *Attorney, Agent, or Firm* — Rylander & Associates, PC; Philip R. M. Hunt; Kurt M. Rylander (57) ABSTRACT

A non-opaque junction box cover and troubleshooting electronic circuit board are described. The circuit board has one or more light sources. At least one of the light sources is configured to emit light if power is present at a specific terminal stud within the junction box. The non-opaque junction box cover transmits this light, allowing one to troubleshoot a problem in a vehicle's electrical system without opening the junction box. In one embodiment, the circuit board has holes that align with the terminal studs in the junction box. The holes allow the circuit board to connect to the terminal studs physically and electrically without additional fasteners and wires. In another embodiment, the circuit board is coupled to the non-opaque junction box cover. Proper alignment between the non-opaque junction box cover and the circuit board ensure proper electrical contact between the circuit board and the terminal studs.

1 Claim, 7 Drawing Sheets

NON-OPAQUE JUNCTION BOX COVER WITH TROUBLESHOOTING ELECTRONIC CIRCUIT BOARD

CROSS-REFERENCE TO RELATED APPLICATIONS

This application claims benefit of, and priority to, U.S. Provisional Application 61/348,372, filed 26 May 2010, which is incorporated by reference herein.

FIELD OF THE INVENTION

Embodiments of the invention disclosed herein relate generally to the field of vehicle electrical systems. More particularly, embodiments of the invention relate to vehicular electrical junction boxes.

BACKGROUND

Vehicles such as cars, trucks and trailers pulled by cars or trucks typically have electrical systems for powering electrical loads such as running lights, signal lights and small motors. A typical vehicle electrical system has a power source, wiring and junction boxes. The wiring carries the electrical power from the power source to the loads. Junction boxes are used to electrically connect one section of wiring to another section. A typical junction box has a case that encloses electrical terminal studs to which sections of wiring attach. The cover provides protection from water, dirt, oil and other elements. The case typically has a removable junction box cover that mates with a junction box based coupled to the frame of the vehicle.

A junction box is often used in trouble shooting the electrical system. Most mechanics when they encounter an electrical problem on a vehicle, locate a junction box that is electrically between the power source and the load, remove a junction box cover and check for power using a hand-held test device. If power is present in the junction box, then the problem is probably between the junction box and the load. If power is not present in the junction box, then the problem is probably between the power source and the junction box.

Removing the junction box cover can be tedious and time consuming. Some junction box covers snap and off, but this arrangement is less secure. More secure junction box covers are fastened with bolts, screws or some other type of fasteners. Given that vehicular junction boxes are often mounted on the frame of the vehicle in locations that expose the boxes to a harsh environment, securely fastened covers are preferable. What is needed is a way to allow for troubleshooting of the power system of the vehicle without removing junction box covers.

Presently known art attempts to address this problem, but has not completely solved the problem. The following represents a list of known related art:

| Reference: | Issued to: | Date of Issue/Publication |
|---|---|---|
| US Pat. Pub. 2009/269951 | Scheele et al. | Oct. 29, 2009 |
| US Pat. Pub. 2005/037632 | Ihde | Feb. 17, 2005 |
| U.S. Pat. No. 7,491,065 | Wagner | Feb. 17, 2009 |
| U.S. Pat. No. 7,369,059 | Hoffman et al. | May 6, 2008 |
| U.S. Pat. No. 6,657,852 | Reker | Dec. 2, 2003 |
| U.S. Pat. No. 6,265,699 | Scott | Jul. 24, 2001 |
| U.S. Pat. No. 5,549,478 | McGuire | Aug. 27, 1996. |
| U.S. Pat. No. 4,000,447 | Codrino | Dec. 28, 1976 |
| U.S. Pat. No. 3,892,911 | Codrino | Jul. 1, 1975 |

The teachings of each of the above-listed citations (which does not itself incorporate essential material by reference) are herein incorporated by reference. None of the above inventions and patents, taken either singularly or in combination, is seen to describe the instant invention as claimed.

US Published Patent Application 2009/0269951 by Scheele et al. for a "Flexible power distribution module" published Oct. 29, 2009 discloses a power distribution module for a vehicle includes an insulating housing including a component grid, the component grid defining a plurality of circuit protection footprints, the housing further including at least one connector mount or terminal mating location; a printed circuit board ("PCB") located within the housing and beneath the component grid, the PCB holding a plurality of fuse mounting terminals and at least one connector mounting terminal, the PCB including a plurality of conducting traces connecting the fuse mounting terminals to the at least one connector mounting terminal; and a cover that threadingly engages the housing, the threading engagement leading to a locking of the cover to the housing that tends to prevent the cover from loosening from the housing when the vehicle is being driven, the locking of the cover able to be overcome by a person so that the cover can be unthreaded readily from the housing.

US Published Patent Application 2005/0037632 by Ihde for "Lighted trailer wiring adapter" published Feb. 17, 2005 discloses a lighted wiring adapter for connecting a towed vehicle to a towing vehicle and displaying a status of the vehicles' wiring. The adapter allows circuits on the towed vehicle to be powered or otherwise operated through circuits on the towing vehicle. The adapter broadly comprises a housing operable to physically connect the towed vehicle's wiring to the towing vehicle's wiring, a plurality of conductors internal to the housing each operable to electrically individually connect one of the towed vehicle's circuits to one of the towing vehicle's circuits, and at least one light to display the status of one of the circuits. The light may be colored or positioned to indicate which circuit powers the light.

U.S. Pat. No. 7,491,065 to Wagner for a "Surface mount trailer electrical connector" issued Feb. 17, 2009 discloses an improved, low profile, surface mounted female electrical connector for mounting to a vehicle. The connector has a flat rear surface that facilitates mounting on many different vehicles in many different locations. The connector may be mounted with or without drilling holes in the tow vehicle. The connector includes easy-to-use wire connectors with LED indicator lights to verify correct electrical connections between the tow vehicle and the electrical connector.

U.S. Pat. No. 7,369,059 to Hoffman et al. for "Electrical apparatus having status indicating means" issued May 6, 2008 discloses an electrical power distribution device such as a junction box or the like includes a status indicator that also serves not only to indicate the status of energization of a connector mounted in a first housing opening, but also to illuminate a translucent indicia-bearing plate mounted in second housing opening. The housing contains a chamber in which are mounted a light emitting diode that is energized simultaneously with the connector, and a light transmitting member that directs the light produced by the LED toward the second housing opening.

U.S. Pat. No. 6,657,852 to Reker for a "Junction box and distributor assembly" issued Dec. 2, 2003 discloses a junction box and distributor assembly includes an external connector that is mounted on a distributor device for connection with a mating companion connector that is mounted in an opening contained in a wall of the junction box, whereby remotely located sensors may be connected via the distribution device and the mating connectors with a programmable operating module contained within the junction box. In order to prevent the penetration of moisture into the junction box, a first seal is arranged about the housing opening between the distributor device and the outer surface of the housing wall. A second seal may be provided in compressed relation concentrically between the peripheral surface of the housing opening and the outer peripheral surface of the second connector.

U.S. Pat. No. 6,265,699 to Scott for a "Water heater with electronic control" issued Jul. 24, 2001 discloses A water heater of the invention includes a water container; an element located to heat water in the water container; a sensor located to sense temperature; and a controller, the controller monitors the sensed temperature at termination of a defined time interval and compares the sensed temperature against a predetermined temperature, with the controller further identifying the element as defective when the sensed temperature is less than the predetermined temperature.

U.S. Pat. No. 5,549,478 to McGuire for a "Universal trailer light locator" issued Aug. 27, 1996 discloses a versatile, water-resistant trailer interface device that is capable of adaptation to a variety of connector assemblies. The mechanical and electrical apparatus is comprised of versatile connectors, a circuit board, indicator lights, resistors, a test circuit, wires and a casing. The user can test and connect each pin separately without the need for special tools. The large resistor prevents the destruction of automobile or trailer fuses.

U.S. Pat. No. 4,000,447 to Codrino for a "Electrical junction box for motor vehicles having printed circuit fuse means and connecting means therein" issued Dec. 28, 1976 discloses a junction box for a motor vehicle electrical system for coupling electrical conductors extending from the rear of a vehicle with conductors extending to the front of a vehicle, comprising an integrally moulded body having removable end, top and bottom walls and an intermediate plate which can be slidably engaged in guides in the side walls of the body. The removable end and bottom walls are provided with connector units for connecting electrical conductors of the external circuit to the junction box. These connector units are interconnected internally by flexible printed circuit connectors which also make contact with actuating elements, such as relays, and with printed circuit fuses mounted in sheets on pivoted support plates by means of which fuse changing is facilitated.

U.S. Pat. No. 3,892,911 to Codrino for a "Junction box for a motor vehicle electrical systems" issued Jul. 1, 1975, discloses a junction box for a motor vehicle electrical system for coupling electrical leads extending to the rear of a vehicle with leads extending to the front of a vehicle, comprising a moulded body having various component parts, notably a tray member, one end wall and a bottom wall, constructed separately and carrying connector blocks for flat pin connector terminals; the connector blocks are interconnected internally to one another and to the tray member which houses the safety fuses of the circuits and various electromagnetic actuator devices, and which has a transparent lid.

SUMMARY AND ADVANTAGES

A non-opaque junction box cover and troubleshooting electronic circuit board for a vehicle junction box are described herein. Methods for installing the same are also described. The circuit board has one or more light sources. At least one of the light sources emits light if power is present on a specific terminal stud within the junction box. The non-opaque junction box cover transmits this light, allowing one to troubleshoot a problem in a vehicle's electrical system without opening the junction box. In one embodiment, the circuit board has holes that align with the terminal studs in the junction box. The holes allow the circuit board to connect to the terminal studs physically and electrically without additional fasteners and wires. In another embodiment, the circuit board is coupled to the non-opaque junction box cover. Proper alignment between the non-opaque junction box cover and the circuit board ensure proper electrical contact between the circuit board and the terminal studs.

Advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

An embodiment of the present invention is illustrated by way of example and not limitation in the figures of the accompanying drawings, in which like references indicate similar elements and in which.

REFERENCE NUMBERS USED IN DRAWINGS

Turning now descriptively to the drawings, in which similar reference characters denote similar elements throughout the several views, the figures illustrate the non-opaque junction box cover and troubleshooting electronic circuit board for a vehicle junction box of the present invention. With regard to the reference numerals used, the following numbering is used throughout the various drawing figures:

| | | | |
|---|---|---|---|
| 100 | junction box | 102 | vehicle frame |
| 106 | junction box cover | 108 | junction box base |
| 110 | wiring harness | 120 | terminal block |
| 122 | terminal stud | 124 | ground stud |
| 126 | power stud | 128 | stud separator |
| 130 | non-opaque junction box cover | 132 | circuit board |
| 134 | light source | 140 | ground conductor |
| 142 | circuit board hole | 144 | circuit board slot |
| 146 | circuit board finger | 150 | jumper wires |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

One or more embodiments of the present invention are described herein. In the following description, for purposes of explanation, numerous specific details are set forth in order to provide a thorough understanding of these embodiments. It will be evident to one skilled in the art that the present invention may be practiced without some of these details. On the other hand, to avoid obscuring the invention, in describing some embodiments, certain details necessary for a functioning device are not shown, but one skilled in the art would understand these necessary details are present.

Reference to "one embodiment" or "an embodiment" in the description of a particular feature, structure, or characteristic means that the particular feature, structure, or characteristic described is included in at least one embodiment of the invention. The appearances of the phrase "in one embodiment" in various places in the specification are not necessarily all referring to the same embodiment.

Figure 1:
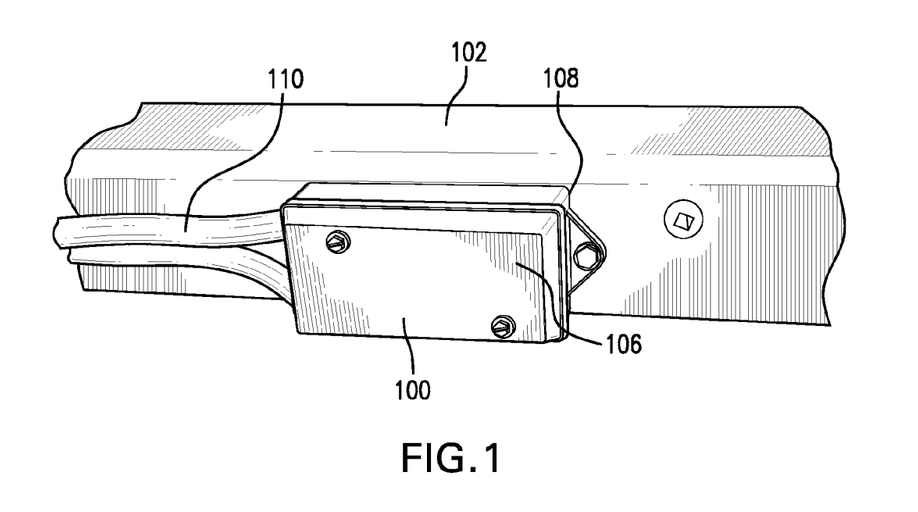
FIG. 1 shows a junction box with an opaque cover mounted on a vehicle frame.

FIG. 1 shows a junction box 100 mounted on a vehicle frame 102. The junction box 100 has a junction box cover 106 that mates with a junction box base 108. The junction box 100 is configured to couple with one or more wiring harnesses 110. At least one of the wiring harnesses 110 has at least one power wire that electrically connects to a high potential terminal of a power source, typically a battery or an alternator. The power wire may physically connect directly to the power source or may physically connect to the power source indirectly through one or more connectors, switches, junction boxes or additional wires. For example, if the junction box 100 is mounted on a trailer, the power source is typically on a truck pulling the trailer. The power wire connected to the junction box 100 physically terminates in a trailer side connector. The trailer side connector is configured to mate to a truck side connector. The truck side connector is physically connected to a power wire on the truck that electrically connects to the truck power source.

Figure 2:
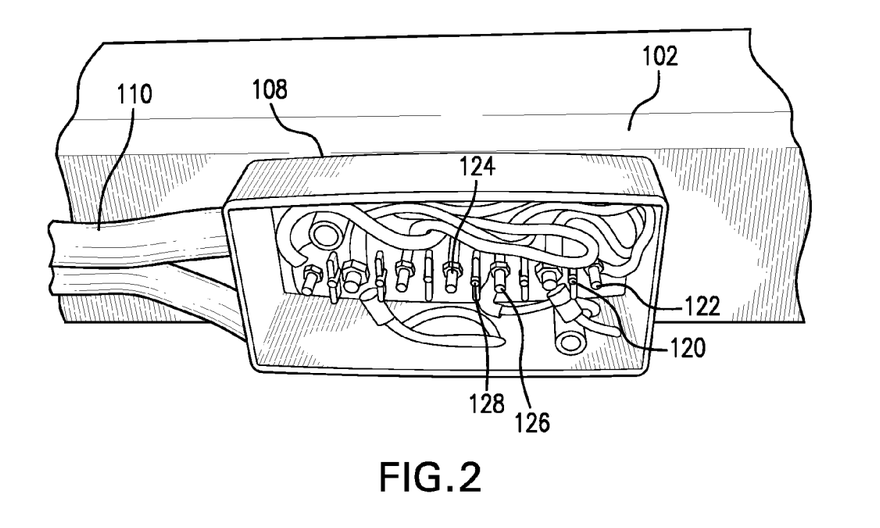
FIG. 2 shows the junction box with the cover removed, a terminal block with terminal studs visible.

FIG. 2 shows the junction box 100 with the junction box cover 106 removed, revealing the junction box base 108 and a terminal block 120 physically coupled to the junction box base 108. The terminal block 120 has a plurality of terminal studs 122 and at least one stud separator 128. The stud separator 128 is a fin of insulating material shaped and positioned to bar accidental electrical contact between adjacent terminal studs 122 when connecting or disconnecting wires to the terminal studs 122. At least one of the studs is a ground stud 124. The ground stud 124 is electrically connected back to a low potential side (ground) of the power source through a return wire or through a vehicle frame. At least one of the terminal studs 122 that is not a ground stud 124 is a power stud 126. A power stud 126 is configured to be electrically connected to the high potential terminal of the power source. The power stud 126 is configured to be electrically connected to a load wire, electrically connecting to a specific load. Typically, different power studs 126 are connected to different load wires and to different loads. For example, a first power stud 126 may be connected to a first load wire connected to a set of running lights and second power stud 126 may be connected to a second load wire connected to a set of brake lights. One or more of the power studs 126 may be connected to a single power wire that electrically connects with the power source. This arrangement might be used when control and switching of the loads is performed downstream (electrically farther from the high potential terminal of the power source) from the junction box 100. More typically, the power studs 126 are each connected to a different power wire. This arrangement would allow for switching and control of each load to be performed upstream (electrically closer to the high potential terminal of the power source) of the junction box 100. For example, for a junction box 100 on a trailer, the switching for the brake lights would most likely be performed on the truck pulling the trailer, as would the switching for a turn signal light.

Figure 3:
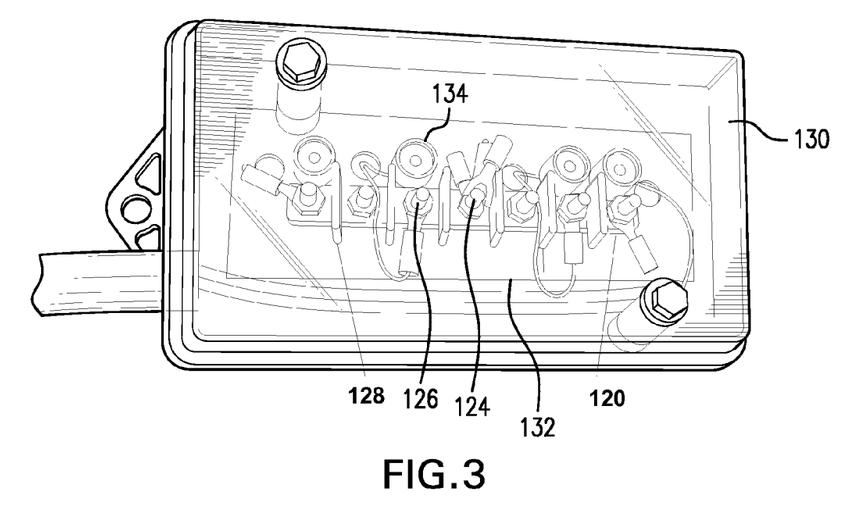
FIG. 3 shows the junction box with a non-opaque cover and troubleshooting electronic circuit board installed.

FIG. 3 shows the junction box 100 with a first embodiment of the invention coupled. This first embodiment comprises a non-opaque junction box cover 130 and a circuit board 132. The circuit board 132 is configured to couple to the terminal block 120. The circuit board 132 has one or more light sources 134. At least one of the light sources 134 is associated with one of the power studs 126. The circuit board 132 has a ground conductor 140 that is electrically connected with a low potential terminal of at least one of the light sources 134. The circuit board 132 is configured to make electrical contact from the ground conductor 140 to the ground stud 124 when the circuit board 132 is coupled to the terminal block 120. The circuit board 132 is configured to make electrical contact between a high potential terminal of at least one of the light sources 134 and its associated power stud 126 when the circuit board 132 is coupled to the terminal block 120. When a power stud 126 is energized (electrically connected to the high potential terminal of the power source), the light source 134 will emit light. When the non-opaque junction box cover 130 is coupled with junction box base 108, at least one light source 134 is visible through the non-opaque junction box cover 130. Thus without removing the non-opaque junction box cover 130, an observer can determine which of the power studs 126 is energized. If the power wire connected to the power stud 126 is switched on and off upstream of the junction box 100, the associated light source 134 will switch on and off accordingly.

In the first embodiment at least one of the light sources 134 is a light emitting diode (LED). In some embodiments, at least one of the light sources 134 is an incandescent bulb.

In the first embodiment the non-opaque junction box cover 130 is transparent. In other embodiments, the non-opaque junction box cover 130 is translucent. The light sources 134 are not visible when not emitting, but light from at least one of the light sources 134 is visible to an observer outside the junction box 100 when the light source 134 is emitting. In other embodiments, the non-opaque junction box cover 130 is generally opaque with one or more transparent portions or translucent portions so that light from at least one of the light sources 134 is visible to an observer outside the junction box 100 when the light source 134 is emitting.

In a second embodiment, the circuit board 132 is coupled to the non-opaque junction box cover 130. The circuit board 132 and junction box 100 are configured in such a manner that the circuit board 132 makes electrical contact with one or more of the power studs 126 and with the ground stud 124 when the non-opaque junction box cover 130 is coupled with the junction box base 108.

In some embodiments, labeling is coupled to or written on the circuit board 132 to identify the loads associated with the respective power studs 126. In other embodiments, such labeling is coupled to or written on the non-opaque junction box cover 130.

Figure 4:
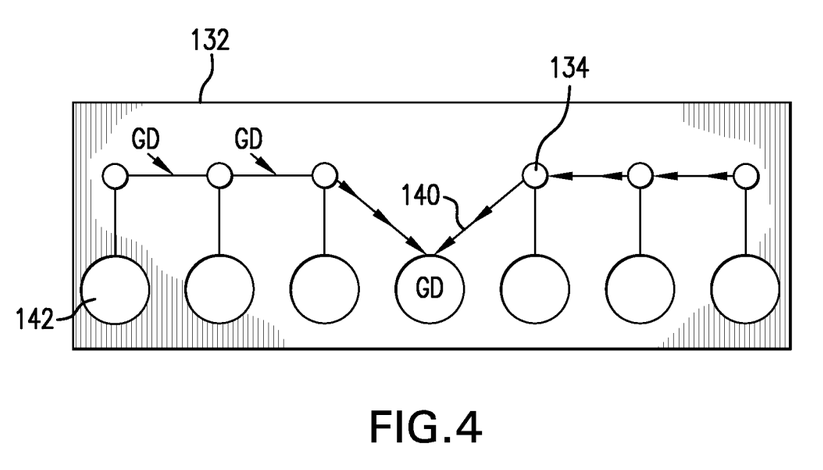
FIG. 4 shows the troubleshooting electronic circuit board physical and electrical layout.

FIG. 4 shows an embodiment of the physical and electrical layout of the troubleshooting electronic circuit board 132. The circuit board 132 has circuit board holes 142 in it such that when the circuit board 132 is properly coupled to the terminal block 120, the terminal studs 122 penetrate the circuit board holes 142. Electrical contact is made between at least one terminal stud and the circuit board 132 at the circuit board hole 142 penetrated by the terminal stud. The circuit board 132 is held in place with nothing more than the terminal studs 122 and the non-opaque junction box cover 130. This configuration allows the circuit board 132 to be installed in the junction box 100 more quickly and at a lower cost than if installed in other ways. In other embodiments, additional fasteners are used to physically couple the circuit board 132 to the junction box 100.

In other embodiments, the circuit board 132 does not have the circuit board holes 142 for the terminal studs 122. In some of these embodiments, additional wiring connects the circuit board 132 to the terminal studs 122. In other of these embodiments, a back side of the circuit board 132 has one or more contacts configured to make electrical contact with one or more of the terminal studs 122.

Figure 5:
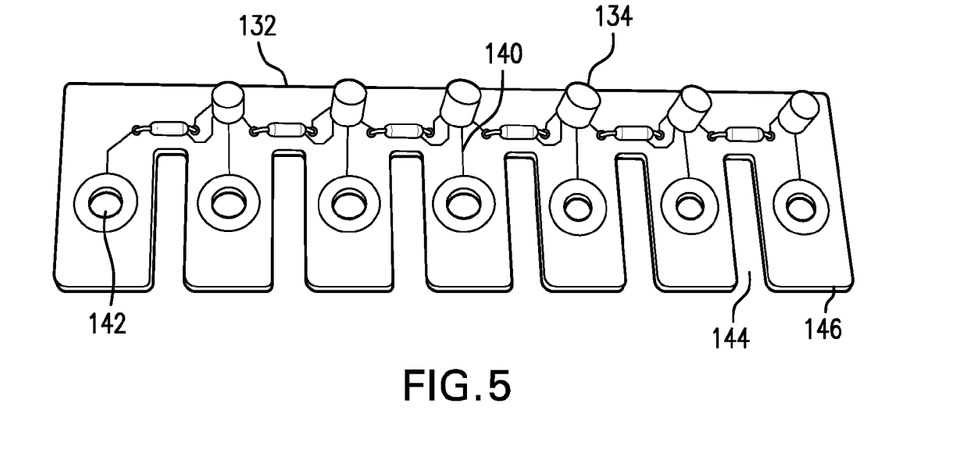
FIG. 5 shows an embodiment of a troubleshooting circuit board with slots and fingers.

FIG. 5 shows another embodiment of the troubleshooting electronic circuit board 132. This embodiment is similar to the embodiment shown in FIG. 4 with the addition of one or more circuit board slots 144 in the circuit board 132, creating at least one circuit board finger 146. The circuit board finger 146 is shaped to fit between the stud separators 128 when the circuit board holes 142 mate with the terminal studs 122.

Figure 6:
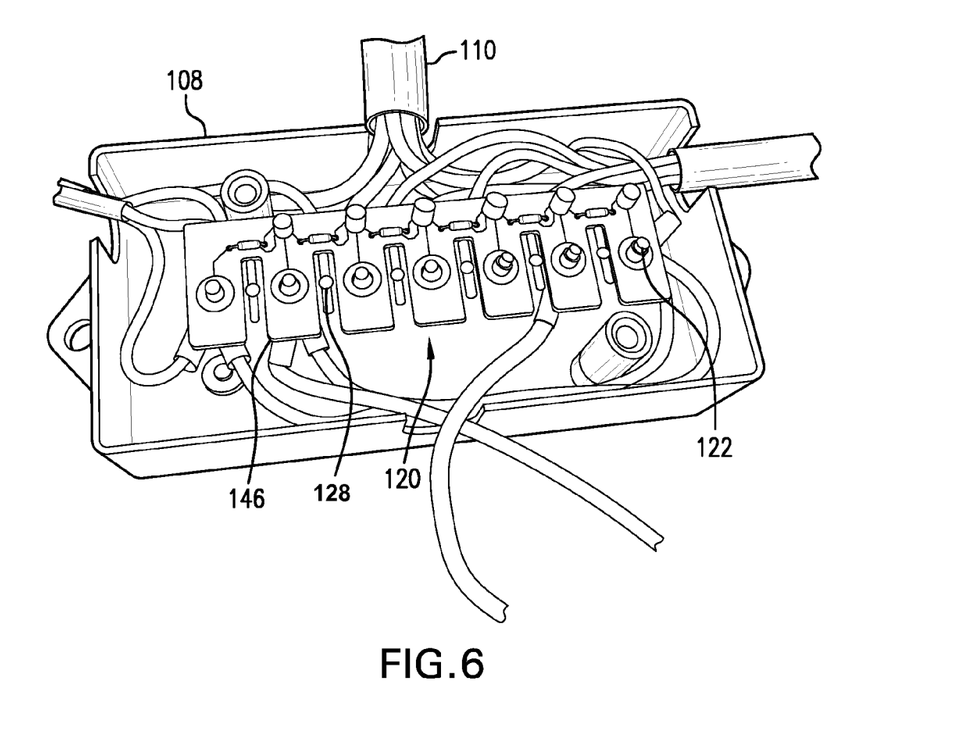
FIG. 6 shows the circuit board of FIG. 5 mated with the terminal block in the junction box base.

FIG. 6 shows the circuit board 132 of FIG. 5 mated with the terminal block 120 in the junction box base 108. The circuit board slots 144 allow the circuit board 132 to be position closer to the terminal block 120 than if the circuit board 132 did not have circuit board slots 144. In this embodiment, the circuit board 132 is held in place with nothing more than the terminal studs 122 and the non-opaque junction box cover 130 (not shown in this figure). In other embodiments, additional fasteners are used to physically couple the circuit board 132 to the junction box 100. For example, additional nuts may be attached to one or more of the terminal studs 122, holding the circuit board 132 against the nuts securing the wires to the terminal block 120.

In another embodiment, the circuit board 132 is mated with the terminal studs 122 before wires and securing nuts are attached to the terminal studs 122. This configuration allows the circuit board 132 to be secured to the terminal studs 122 with nuts, but without the cost of additional nuts.

Figure 7:
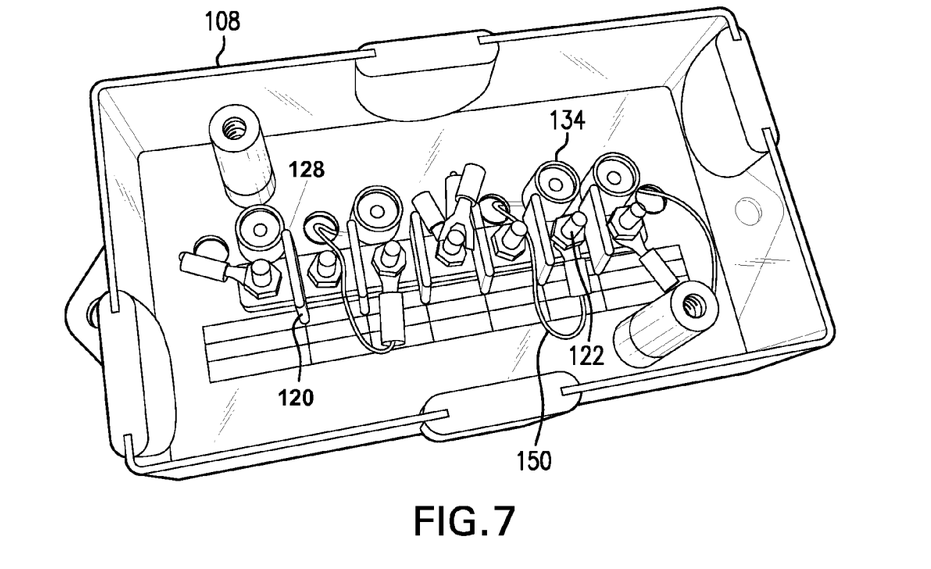
FIG. 7 shows an embodiment in which one or more light sources are physically coupled to the junction box base, but not through the terminal studs.

FIG. 7 shows an embodiment in which the one or more light sources 134 are physically coupled to the junction box base 108, but not through the terminal studs 122. Jumper wires 150 electrically coupled the light sources 134 to their respective terminal studs 122.

A method for installing the non-opaque junction box cover 130 and circuit board 132 described in the first embodiment is as follows. The original opaque junction box cover 106 is removed from the junction box base 108 and discarded. The terminal studs 122 are cleaned off to ensure the dimensions of the terminal studs 122 are within tolerance to mate with the circuit board hole 142 in the circuit board 132 and to ensure good electrical contact. Next, the circuit board 132 is coupled to the terminal block 120 by aligning the circuit board holes 142 in the circuit board 132 with the terminal studs 122, then pushing the circuit board 132 back to mate with the terminal studs 122. Then the non-opaque junction box cover 130 is coupled with the junction box base 108.

A method for installing the non-opaque junction box cover 130 with coupled circuit board 132 described in the second embodiment is as follows. The original opaque junction box cover 106 is removed from the junction box base 108 and discarded. The terminal studs 122 are cleaned off to ensure good electrical contact. Then the non-opaque junction box cover 130 is coupled with the junction box base 108. If the alignment between the non-opaque junction box cover 130 and the junction box base 108 is correct, then electrical contact between the circuit board 132 and the terminal studs 122 is ensured by the alignment between the junction box cover 130 and the circuit board 132.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

What is claimed:

1. An apparatus comprising:
   a circuit board configured to electrically couple to a plurality of terminal studs coupled to a junction box base, wherein the circuit board has a plurality of circuit board holes configured to physically mate with the terminal studs, wherein the circuit board has a plurality of circuit board fingers configured to fit between a plurality of stud separators coupled to the junction box base; and
   a light source coupled to the circuit board configured to transmit light based on whether one of the terminal studs is energized.

* * * * *